US012273258B1

(12) United States Patent
Segal et al.

(10) Patent No.: US 12,273,258 B1
(45) Date of Patent: Apr. 8, 2025

(54) SYSTEM AND METHOD FOR DETERMINING CODE REACHABILITY IN A NETWORKED COMPUTING ENVIRONMENT

(71) Applicant: Wiz, Inc., New York, NY (US)

(72) Inventors: Assaf Segal, Tel Aviv (IL); Ami Luttwak, Binyamina (IL); Shir Tamari, Tel Aviv (IL); Arnon Trabelsi, Tel Aviv (IL); Amir Lande Blau, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/917,690

(22) Filed: Oct. 16, 2024

(51) Int. Cl.
| | |
|---|---|
| *H04L 29/06* | (2006.01) |
| *G06F 21/57* | (2013.01) |
| *G06F 21/62* | (2013.01) |
| *H04L 9/40* | (2022.01) |
| *H04L 45/02* | (2022.01) |

(52) U.S. Cl.
CPC ............ *H04L 45/02* (2013.01); *G06F 21/577* (2013.01); *G06F 21/62* (2013.01); *H04L 63/1416* (2013.01); *H04L 63/1433* (2013.01); *H04L 63/1441* (2013.01)

(58) Field of Classification Search
CPC . H04L 45/02; H04L 63/1416; H04L 63/1433; H04L 63/1441; G06F 21/577; G06F 21/62
See application file for complete search history.

(56) References Cited

U.S. PATENT DOCUMENTS

| | | | |
|---|---|---|---|
| 10,515,212 B1* | 12/2019 | McClintock | ............ G06F 21/57 |
| 11,218,510 B2 | 1/2022 | Crabtree et al. | |
| 11,297,109 B2 | 4/2022 | Crabtree et al. | |
| 11,587,177 B2 | 2/2023 | Sankar et al. | |
| 2016/0112445 A1* | 4/2016 | Abramowitz | .......... G06Q 40/08 |
| | | | 726/23 |
| 2020/0396254 A1* | 12/2020 | Crabtree | .................. H04L 63/20 |
| 2021/0021644 A1* | 1/2021 | Crabtree | ............... G06F 16/951 |
| 2022/0286479 A1* | 9/2022 | Keren | .................... H04L 63/101 |
| 2023/0164164 A1* | 5/2023 | Herzberg | ................. H04L 63/20 |
| | | | 726/1 |
| 2023/0336550 A1* | 10/2023 | Lidgi | ....................... H04L 63/10 |
| 2024/0146745 A1* | 5/2024 | Lidgi | .................. H04L 63/1416 |
| 2024/0168792 A1* | 5/2024 | Shemesh | ................. G06F 21/53 |
| 2024/0214382 A1* | 6/2024 | Lidgi | .................... G06F 40/205 |

\* cited by examiner

*Primary Examiner* — Lisa C Lewis
(74) *Attorney, Agent, or Firm* — M&B IP Analysts, LLC

(57) ABSTRACT

A system and method for performing inspection of a reachable code object of a cloud computing environment is presented. The method includes detecting a network path for each resource of a plurality of resources deployed in a cloud computing environment, wherein the network path includes at least a portion between an external network and the cloud computing environment; determining reachability parameters of each resource of the plurality of resources for which a network path is detected; accessing a code repository including a plurality of code objects; actively inspecting the network path of a resource to determine if the network path is a viable network path; mapping each resource having a viable network path to a code object of the plurality of code objects; inspecting a mapped code object for a cybersecurity object; and initiating a remediation action based on the cybersecurity object.

23 Claims, 9 Drawing Sheets

SYSTEM AND METHOD FOR DETERMINING CODE REACHABILITY IN A NETWORKED COMPUTING ENVIRONMENT

TECHNICAL FIELD

The present disclosure relates generally to cybersecurity risk remediation, and specifically to improving scanning of cloud computing environments by inspecting only reachable code objects of a cloud environment.

BACKGROUND

External attack surface management (EASM) is a term which for a technology field and best practices which are utilized in cybersecurity to describe what vulnerabilities an organization has within their network infrastructure, which may include cloud computing environments, local network environments, and the like. For example, an organization may have a virtual private cloud (VPC) implemented in Amazon® Web Services (AWS), Microsoft® Azure, Google® Cloud Platform (GCP), and the like, which serves as a cloud computing environment. The cloud computing environment may include a plurality of workloads, such as virtual machines, container engines, serverless functions, and the like, any of which may pose a security risk, for example by having a vulnerability, allowing an attacker to infiltrate the organization's network in an unintended manner.

EASM technologies aim to discover where an organization is vulnerable, in order for a network administrator to secure the discovered vulnerabilities. For example, discovering an out-of-date operating system (OS) having a known vulnerability running on a virtual machine may require the network administrator to update the OS version, or apply a software patch, in order to address the vulnerability. This is also known as minimizing the external attack surface.

One such technology which may be deployed in order to discover the external attack surface is active scanning. Active scanning attempts to infiltrate a network (e.g., access resources in the above mentioned VPC), for example, by sending packets to endpoints in the network. Thus, an active scanner may attempt to access random domains, at random ports, in order to gain access to a network or to a network resource.

This method has some serious drawbacks. For example, attempting to guess random domains, random ports, and the like, creates a large volume of network traffic which the target (i.e., organization's network) must deal with. This may congest the network, and further risks malfunctions, such as a denial of service to other clients, data corruption from incompatible queries, and the like. It is often of upmost importance to an organization to keep a production environment in a fully operational state. Therefore, using an active scanner to test accessibility of an active production environment may be detrimental to this objective, since it would require devotion of substantial resources at least in terms of network bandwidth to perform such tests It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a network path for each resource of a plurality of resources deployed in a cloud computing environment, where the network path includes at least a portion between an external network and the cloud computing environment. The method may also include determining reachability parameters of each resource of the plurality of resources for which a network path is detected. The method may furthermore include accessing a code repository including a plurality of code objects. The method may in addition include actively inspecting the network path of a resource to determine if the network path is a viable network path. The method may moreover include mapping each resource having a viable network path to a code object of the plurality of code objects. The method may also include inspecting a mapped code object for a cybersecurity object; and initiating a remediation action based on the cybersecurity object. Other embodiments of this aspect include corresponding computer systems, apparatus, and computer programs recorded on one or more computer storage devices, each configured to perform the actions of the methods.

Implementations may include one or more of the following features. The method may include: generating the reachability parameters utilizing static analysis. The method may include: generating the network path for a resource based on the reachability parameters. The method may include: determining whether the network path is viable by executing an access instruction over the network path. The method may include: detecting an identifier of a resource; detecting an identifier of a code object, where the identifier of the resource indicates the identifier of the resource. The method may include: mapping the resource to the code object based on the detected identifiers. The method may include: inspecting only a mapped code object for a cybersecurity object. The method may include: detecting a second cybersecurity object in the mapped code object; and detecting a cybersecurity risk based on the detected cybersecurity object and the detected second cybersecurity object. The method may include: initiating the remediation action to generate a new code object, the new code object based on the mapped code object. The method may include: generating the new code object by removing the cybersecurity object from the mapped code object. Implementations of the described techniques may include hardware, a method or process, or a computer tangible medium.

In one general aspect, method may include generating the remediation action, where the remediation action includes any one of: revoking access to a resource, generating a new code object, revoking access from a resource, and any combination thereof. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a device, cause the device to: detect a network path for each resource of a plurality of resources deployed in a cloud computing environment, where the network path includes at least a portion between an external network and the cloud computing environment; determine reachability parameters of each resource of the plurality of resources for which a network path is detected; access a code repository including a plurality of code objects; actively inspect the network path of a resource to determine if the network path is a viable network path; map each resource having a viable network path to a code object of the plurality of code objects. Non-transitory computer-readable medium may also inspect a mapped code object for a cybersecurity object; and initiate a remediation action based on the cybersecurity object. Other embodiments of this aspect include corresponding computer systems, apparatus, and computer programs recorded on one or more computer storage devices, each configured to perform the actions of the methods.

In one general aspect, system may include one or more processors. The system may also detect a network path for each resource of a plurality of resources deployed in a cloud computing environment, where the network path includes at least a portion between an external network and the cloud computing environment. The system may furthermore determine reachability parameters of each resource of the plurality of resources for which a network path is detected. The system may in addition access a code repository including a plurality of code objects. The system may moreover actively inspect the network path of a resource to determine if the network path is a viable network path. The system may also map each resource having a viable network path to a code object of the plurality of code objects. The system may furthermore inspect a mapped code object for a cybersecurity object. The system may in addition initiate a remediation action based on the cybersecurity object. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: generate the reachability parameters utilizing static analysis. The system where the one or more processors are further configured to: generate the network path for a resource based on the reachability parameters. The system where the one or more processors are further configured to: determine whether the network path is viable by executing an access instruction over the network path. The system where the one or more processors are further configured to: detect an identifier of a resource; and detect an identifier of a code object, where the identifier of the resource indicates the identifier of the resource. The system where the one or more processors are further configured to: map the resource to the code object based on the detected identifiers. The system where the one or more processors are further configured to: inspect only a mapped code object for a cybersecurity object. The system where the one or more processors are further configured to: detect a second cybersecurity object in the mapped code object; and detect a cybersecurity risk based on the detected cybersecurity object and the detected second cybersecurity object. The system where the one or more processors are further configured to: initiate the remediation action to generate a new code object, the new code object based on the mapped code object. The system where the one or more processors are further configured to: generate the new code object by removing the cybersecurity object from the mapped code object. Implementations of the described techniques may include hardware, a method or process, or a computer tangible medium.

In one general aspect, system may include one or more processors. The system may also generate the remediation action, where the remediation action includes any one of. The system may furthermore revoke access to a resource, generating a new code object, revoking access from a resource, and any combination thereof. Other embodiments of this aspect corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
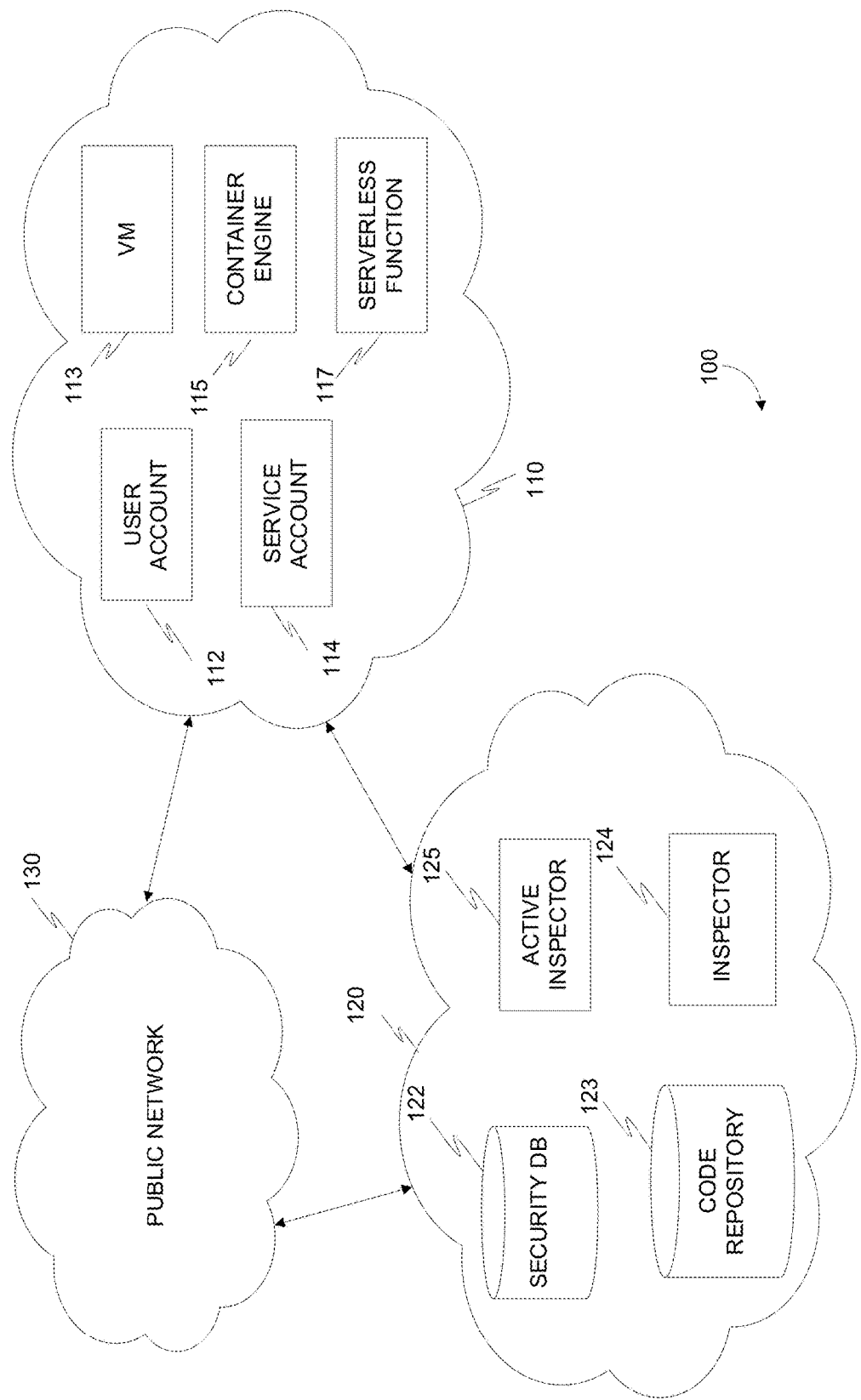
FIG. 1 is a diagram of a cloud computing environment monitored by an active inspector, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include A system and method for performing active inspection of a cloud computing environment includes receiving at least one network path to access a first resource, wherein the first resource is a cloud object deployed in the cloud computing environment, and potentially accessible from a network which is external to the cloud computing environment; and actively inspecting the at least one network path to determine if the first resource is accessible through the at least one network path from a network external to the cloud computing environment.

Various techniques of static analysis can be used in order to determine reachability properties of a resource deployed in a cloud computing environment. Reachability properties, or parameters, may be utilized to establish a network path to the resource from an external network through the cloud computing environment. An access instruction may be generated based on the network path to determine if a network path generated through static analysis is indeed a viable path to reach the resource. Determining what network paths are viable is advantageous as it exposes what network paths can be used to access the cloud computing environment from external networks, and therefore what parts of the cloud computing environment are in practice opened to attack. These network paths should be addressed by system administrators as early as possible to minimize the effect of a cyber-attack.

FIG. 1 is an example diagram 100 of a cloud computing environment monitored by an active inspector, implemented in accordance with an embodiment. A first cloud environment 110 includes a plurality of principals and resources. A resource is a cloud entity which supplies functionality, such as processing power, memory, storage, communication, and the like. A resource may supply more than one functionality. Resources may include, for example, virtual machines (VMs) such as VMs 113, container engines such as container engines 115, serverless functions such as serverless functions 117, and the like. A VM may be implemented using Oracle® VirtualBox. A container engine may be implemented using Kubernetes® or Docker®. A serverless function may implemented using Lambda®.

A principal is a cloud entity which acts on a resource, meaning it can request, or otherwise initiate, actions or operations in the cloud environment which cause a resource to perform a function. A principal may be, for example, a user account such as user account 112, a service account such as service account 114, a role, and the like. In an embodiment a user account 112 is implemented as a data structure which includes information about an entity, such as username, a password hash, an associated role, and the like.

The first cloud environment 110 may be implemented utilizing a cloud infrastructure, such as Amazon® Web Services (AWS), Microsoft® Azure, Google® Cloud Platform (GCP), and the like. In an embodiment, the first cloud environment 110 may be implemented as a virtual private cloud (VPC) on such a cloud infrastructure. The first cloud environment 110 may be, for example, a production environment for an organization. A production environment is a computing environment which provides services, for example, to client devices within the production environment and outside of it. An organization may also have a staging environment, which is a computing environment substantially identical to the production environment in at least some deployments of resource (e.g., workloads) which is used for the purpose of testing new policies, new permissions, new applications, new appliances, new resources, and the like, which are not present in the production environment.

It is often of upmost importance to an organization to keep the production environment in a fully operational state. Therefore, using an active scanner to test accessibility to the first cloud environment 110 may be detrimental to this objective, since it would require devotion of substantial resources at least in terms of network bandwidth to perform such tests.

An inspection environment 120 is communicatively connected with the first cloud environment 110, and a public network 130. The public network 130 is also communicatively connected with the first cloud environment 110. In an embodiment, the public network 130 may be, but is not limited to, a wireless, cellular or wired network, a local area network (LAN), a wide area network (WAN), a metro area network (MAN), the Internet, the worldwide web (WWW), similar networks, and any combination thereof.

The inspection environment 120 may be implemented as a VPC in a cloud infrastructure. In an embodiment, the cloud infrastructure of the inspection environment 120 may be the same cloud infrastructure as the first cloud environment 110. In some embodiments, the inspection environment may be implemented as multiple cloud environments, each utilizing a cloud infrastructure. The inspection environment includes a security graph database (DB) 122 for storing a security graph, a code repository 123, for storing code objects, an inspector 124, and at least an active inspector 125.

In an embodiment, the security graph stored in the security graph DB 122 represents at least the first cloud environment 110 using a predefined data schema. For example, each resource and each principal of the first cloud environment 110 may be represented as a corresponding resource node or principal node in the security graph. The various nodes in the security graph may be connected, for example, based on policies, roles, permissions, and the like, which are detected in the first cloud environment 110. A predefined data schema may include data structures including into which values can be inputted to represent a specific cloud entity. For example, a resource may be represented by a template data structure which includes data attributes, whose values uniquely identify the resource, such as address, name, type, OS version, and the like.

The active inspector 125 is configured to receive a network path to access a resource in the first cloud environment 110. In an embodiment, a network path is stored as a data string which includes one or more reachability parameters. Such parameters include host names, protocols, IP addresses, ports, usernames, passwords, and the like. In certain embodiments, the active inspector 125 is further configured to receive a list of network paths. The network paths is received periodically, according to an embodiment.

In certain embodiments, the active inspector 125 is also configured to generate an instruction which includes a query for the security graph. In an embodiments, such instruction, instructions, etc., when executed by the security graph database 122, causes generation of an output including at least a network path. For example, a network path is generated every 24 hours, while active inspection is initiated once per day, once per week, once per month, and so on. In an embodiment, a network path is discovered, detected, etc., utilizing static analysis.

In an embodiment, the active inspector 125 is configured to generate an instruction based on the network path to access the resource associated with the network path. For example, the instruction is to send a data packet to an IP address of the resource, and receive an acknowledgement (ACK) response, according to an embodiment. The active inspector 125 is configured, according to an embodiment, to generate a log which includes, for example, the network path, the instruction sent by the active inspector 125, and any response(s) received from the resource. For example, if the active inspector 125 sends an HTTP (hypertext transfer protocol) request, a response may be a 404 error, a 403 error, 500 error, 502 error, and the like.

In an embodiment, the code repository 123 includes a version control system (VCS) that is configured to store metadata for a set of files, such as code files, and stores the history changes made to those files. For example, in an embodiment, the VCS is deployed utilizing Github®. In some embodiments, the code repository 123 is configured to store code objects, declaration code, a combination thereof and the like. In an embodiment, the inspector 124 is configured to trigger the active inspector 125 to initiate active inspection of a network path to determine if a resource is accessible via the network path from a network which is external to the first cloud environment 110.

In various embodiments, the inspector 124 is configured to receive data regarding network path viability from the active inspector 125. In an embodiment, where the network path of a resource is determined to be viable, the inspector 124 is configured to map the reachable resource to a code object. In an embodiment, the inspector 124 is configured to inspect the code objects for a cybersecurity object to detect a cybersecurity risk. If a cybersecurity risk is detected, the inspector 124 is configured to initiate a remediation action, according to an embodiment.

In certain embodiments, the code repository 123 includes a plurality of code objects, for example having different versions, different deployment parameters, etc. In some embodiments, a first portion of code objects correspond to resources deployed in the cloud environment 110, and a second portion of code objects do not correspond to a deployed resource. This is due, for example, to storing a version of a code object which is no longer in use in deploying resources.

In such embodiments, it is advantageous to inspect for cybersecurity objects only code objects which correspond to resources which are deployed. It is further advantageous to inspect code objects only of resources which are deployed and are reachable resources. This allows to utilize less computational resources for inspection, as less resources, code objects, etc., are inspected, while also presenting only relevant cybersecurity issues. In other words, a cybersecurity issue which is present on a resource that is not accessible from an external network is not as much a threat as a cybersecurity issue which is present on a resource that is accessible from an external network.

Figure 2:
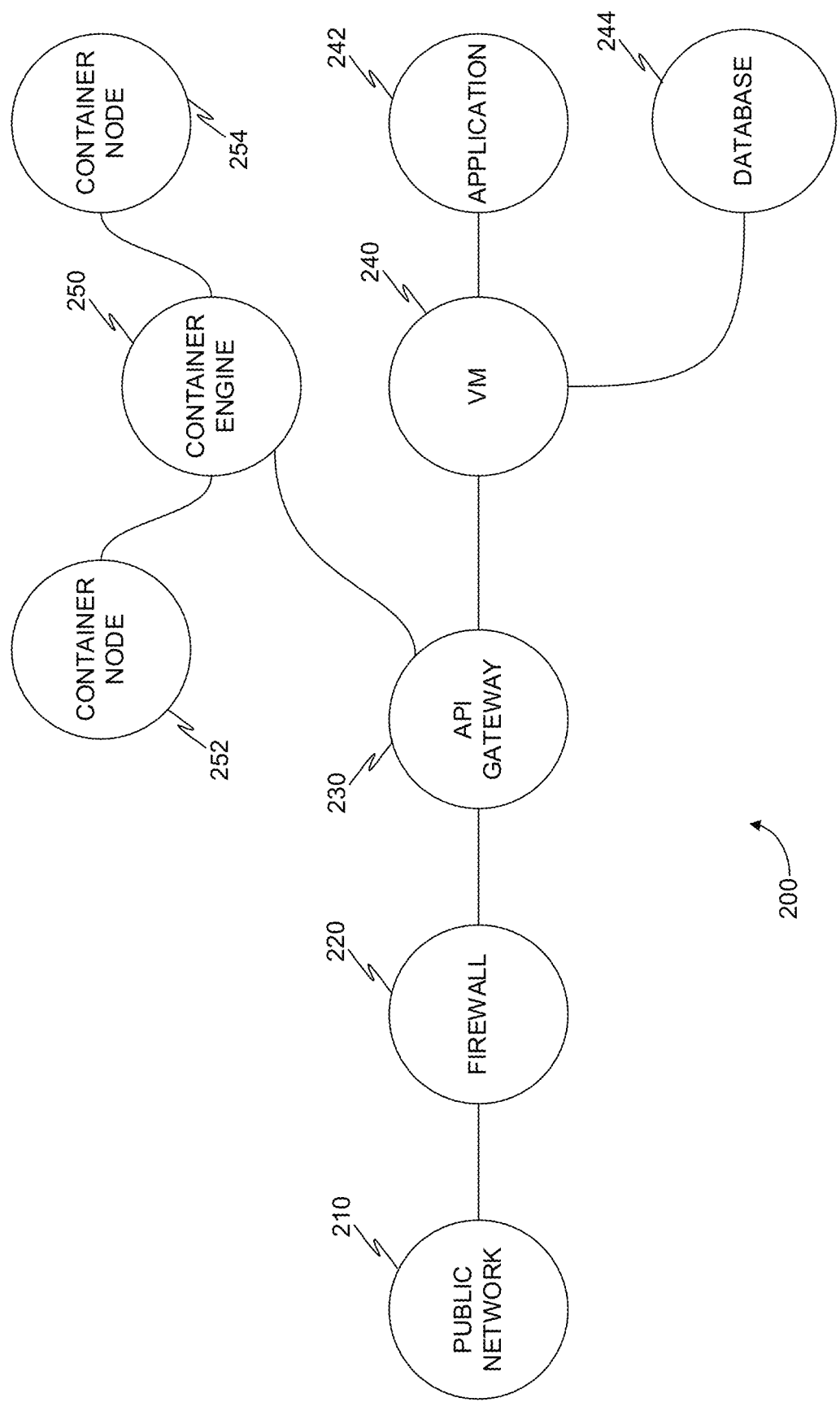
FIG. 2 is a security graph illustrating a network path, implemented in accordance with an embodiment.

FIG. 2 is an example of a security graph 200 illustrating a network path, implemented in accordance with an embodiment. The security graph 200 includes a plurality of nodes, each node connected to at least another node by an edge. In certain embodiments, a pair of nodes may be connected by a plurality of edges. In some embodiments, each edge may indicate a type of connection between the nodes. For example, an edge may indicate a "can access", to indicate that a cloud entity represented by a first node can access the cloud entity represented by a second node.

A first enrichment node 210 (also referred to as public network node 210) represents a public network, such as public network 130 of FIG. 1 above. An enrichment node, such as enrichment node 210, is a node generated based off of insights determined from data collected from a computing environment, such as the first cloud computing environment 110 of FIG. 1 above. An enrichment node may also represent, for example, a vulnerability. By connecting resource nodes in the graph to the enrichment node representing a vulnerability, the security graph 200 may indicate that the resources contain the vulnerability. This allows a compact representation as the security graph does not redundantly store multiple data fields of the same vulnerability in each resource node.

The public network node 210 is connected to a first resource node 220 (also referred to as firewall node 220) representing a firewall workload. The firewall represented by the firewall node 220 may be implemented, for example, as a virtual machine in the first cloud computing environment. Connecting the public network node 210 to the firewall node 220 represents that the firewall is open to transceiving communication between itself and the public network.

The firewall node 220 is further connected to a second resource node 230 (also referred to as API gateway node 230) which represents an API (application programming interface) gateway. An API gateway is a workload, for example a serverless function, which can act as a reverse proxy between a client and resources, accepting API calls, directing them to the appropriate service, workload, resource, etc. and returning a result to the client when appropriate.

The API gateway node 230 is connected to a first principal node 240 (also referred to as VM node 240) representing a virtual machine hosting an application and a database, and is also connected to a second principal node 250 (also referred to as container engine node 250) which hosts a plurality of container nodes represented by nodes 252 and 254. The VM node 240 is connected to an application node 242, and a database node 244. The application node 242 may indicate, for example, that a certain application, having a version number, binaries, files, libraries, and the like, is executed on the VM which is represented by the VM node 240.

In an embodiment, the VM node 240 may be connected to a plurality of application nodes. The database node 244 represents a database which is stored on the VM (represented by VM node 240), or stored on a storage accessible by the VM. The database node 244 may include attributes which define a database, such as type (graph, columnar, distributed, etc.), version number, query language, access policy, and the like.

Figure 3:
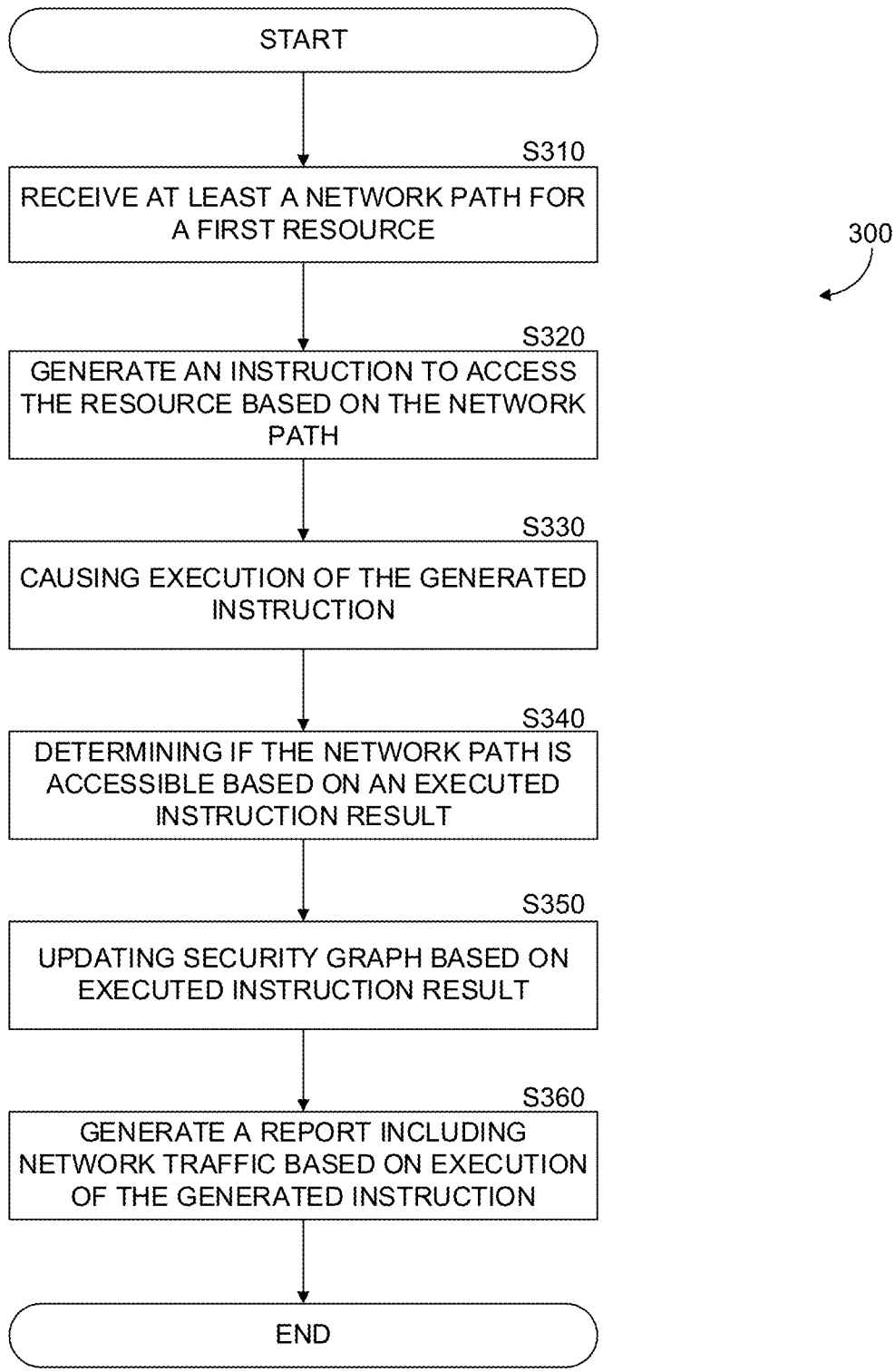
FIG. 3 is a flowchart of a method for performing active inspection of a cloud computing environment, implemented in accordance with an embodiment.

FIG. 3 is an example flowchart 300 of a method for performing active inspection of a cloud computing environment, implemented in accordance with an embodiment.

At S310, at least one network path for a first resource in a cloud computing environment is received. The network path, also known as object reachability, includes data (e.g. reachability parameters) for accessing the first resource from an external network, such as a public network, which is not the cloud computing environment of the first resource, such as the Internet. In an embodiment, an active inspector may receive the at least a network path, for example from a security graph. In an embodiment, an instruction (or instructions) is generated which when executed by a database system storing the security graph returns a result including plurality of resource identifiers, and a respective network path for each of the plurality of resources. In certain embodiments, the network paths may be received periodically.

In some embodiments, the first resource may be one of a plurality of first resources, which are each substantially identical. For example, a group of virtual machines which are generated based on the same code or image are substantially identical, since their initial deployment would be identical other than a unique identifier assigned to each machine. In such embodiments it may be beneficial to inspect the at least one network path for a subset of the plurality of first resources, in order to decrease the computation and network resources required. This may be acceptable in such embodiments, as the expectation is that the plurality of VMs would be accessible in similar network paths. In some embodiments, the subset includes one or more first resources.

In an embodiment, each of the received network paths includes a set of reachability parameters to reach a specific cloud object in the cloud environment. The reachability parameters, and hence the network paths are generated by statically analyzing the cloud environment. An example method for such static analysis is described with reference to FIGS. 4A and 4B below.

At S320, an access instruction is generated to access the first resource based on the network path. In an embodiment, the access instruction is generated by the active inspector deployed outside of the cloud environment where the first resource resides. In certain embodiments, the instruction includes one or more access parameters. Such parameters may include, but are not limited to, a host name, an IP address, a communication protocol, a port, a username, a password, and the like, or combination thereof. A communication protocol may be, for example, HTTP or UDP (user datagram protocol). For example, the instruction may be a ping, GET, CONNECT, or TRACE request over HTTP.

In certain embodiments, a plurality of access instructions may be generated. For example, a plurality of generated access instructions may include a first access instruction having a first request, and a second access instruction having a second request which is different from the first request. For example, the first access instruction may include a CONNECT request, and the second access instruction may include a GET request. In certain embodiments, a plurality of first access instructions may be generated. In such embodiments, each first access instruction may include a same type of request (e.g., CONNECT) with different values (e.g., different web address, different port, and so on). For example, a resource may be reachable at IP address 10.0.0.127, at ports 800 through 805. The IP address and ports would be reachability parameters, based on which an active inspector can generate a plurality of first access instructions based on an HTTP GET request, such as:

GET/bin HTTP/1.1
Host:10.0.0.127:800 and further generate another HTTP GET request:

GET/bin HTTP/1.1
Host:10.0.0.127:801 and so on, which when executed attempt to access a /bin folder in the resource which has an IP address of 10.0.0.127. In certain embodiments, the active inspector (e.g., the active inspector 125 of FIG. 1) may connect to a proxy server (not shown) through the public network 130, and send a first access instruction to a resource in the cloud environment 110 through a first proxy server, and send a second access instruction (which may or may not be identical to the first access instruction) through a second proxy server. In such embodiments, each proxy server may show as originating from a different country of origin, therefore the source would receive access requests from seemingly different sources. This is advantageous to determine, for example, if a resource is configured to block certain network traffic based on geographic location.

At S330, execution of the generated access instruction is caused. The access instruction, when executed, causes an attempt to actually access the resource. In an embodiment, the attempt may result in network traffic being generated, including requests sent to the resource and answers (i.e., data packets) received. While static analysis provides a possible path to access a resource, executing the access instruction provides a real result of an attempt to utilize the possible path, in order to determine which paths are really viable, and which are not. For example, a path may be possible based on static analysis, but not viable, where, for example, an application deployed on the resource prevents such an access from occurring. In an embodiment a network path is determined to be viable (or accessible), if the access instruction, when executed does not return an error message. An error message may be, for example, a timeout (e.g., in response to a "ping" request), a 403 Forbidden (e.g., in response to an HTTP GET request), and the like. In some embodiments, the access instruction may be executed by the active inspector 125.

At S340, a determination is performed to determine if the network path is accessible, based on the execution of the generated access instruction. Performing an active inspection of a cloud environment allows to determine which of the reachability paths (i.e., network paths) are indeed vulnerable, meaning that paths that can be used to gain access into the cloud environment, and which reachability paths (network paths) are not vulnerabilities since the active inspector could not gain access to the resource, therefore the reachability path is not possible in practice. Reachability paths which have been confirmed through both static analysis (i.e., analysis using the security graph) and active inspection are paths which should therefore be considered more vulnerable. In an embodiment, if the network path results in successfully reaching the resource, the network path is determined to be accessible (or viable). If the resource is not reachable by the network path, the network path is determined to be inaccessible (or unviable).

At S350, a security graph is updated based on the network path determination. In certain embodiments, the active inspector may update the security graph, which includes a representation of the cloud environment in which the first resource is deployed, to indicate whether a reachability path is confirmed (i.e., is viable) by active inspection or not, where a confirmed path is a path through which the active inspector successfully accessed a resource. In turn, the security graph may update an alert generated based on determining that a resource has a reachability path through a public network.

At S360, a report is generated based on the execution of the generated instruction. In an embodiment, the report may be generated by the active inspector, which performs this method. In certain embodiments, generating a report may include updating a log with network traffic between the active inspector and the resource. For example, the active inspector may record (e.g., write to a log) the generated instruction, the resource identifier, and a response received from the resource. A response may include, for example, a response code. A response code may indicate success, redirection, client error, server error, and the like, where the client is the active inspector, and the server is the resource. In certain embodiments the security graph stored in the security DB 122 may be updated based on the determined viability of the network paths. For example, if a resource is successfully accessed, or successfully unaccessed (i.e., an attempt was made to access the resource and the attempt was not successful in accessing the resource), this result can be stored as an attribute of a node representing the resource in the security graph. For example, the VM node 240 of FIG. 2 may have an attribute which indicates a reachability status, which may have values corresponding to: successfully reached (i.e., an active inspector successfully accessed this resource), successfully not reach (i.e., an active inspector was not successful in accessing this resource), and undetermined (the active inspector has not yet attempted to access the resource through a network path). In some embodiments, certain network paths may be determined (i.e., as viable or unviable) while others may be undetermined. A node may be associated with a plurality of network paths, each having its own active inspection indicator.

In some embodiments, the active inspector may communicate with a virtual private network (VPN) or a proxy, in order to mask the IP address from which the active inspector is attempting access. This may be useful to test, for example, if a firewall, such as represented by the firewall node 220 of FIG. 2, will let communication through based on blocking or allowing certain IP addresses. In such embodiments, multiple similar instructions may be generated, each originating from a different IP address of the active inspector.

In some embodiments network path may include a plurality of resources. The method above may be performed on each resource of the plurality of resources, to determine the reachability of each resource.

Utilizing an active inspector using network paths generated from a security graph is advantageous, as attempting to access resources in this manner to determine the viability of a network path (i.e., reachability) requires less resources than, for example, randomly guessing network paths in an attempt to access resources.

Figure 5:
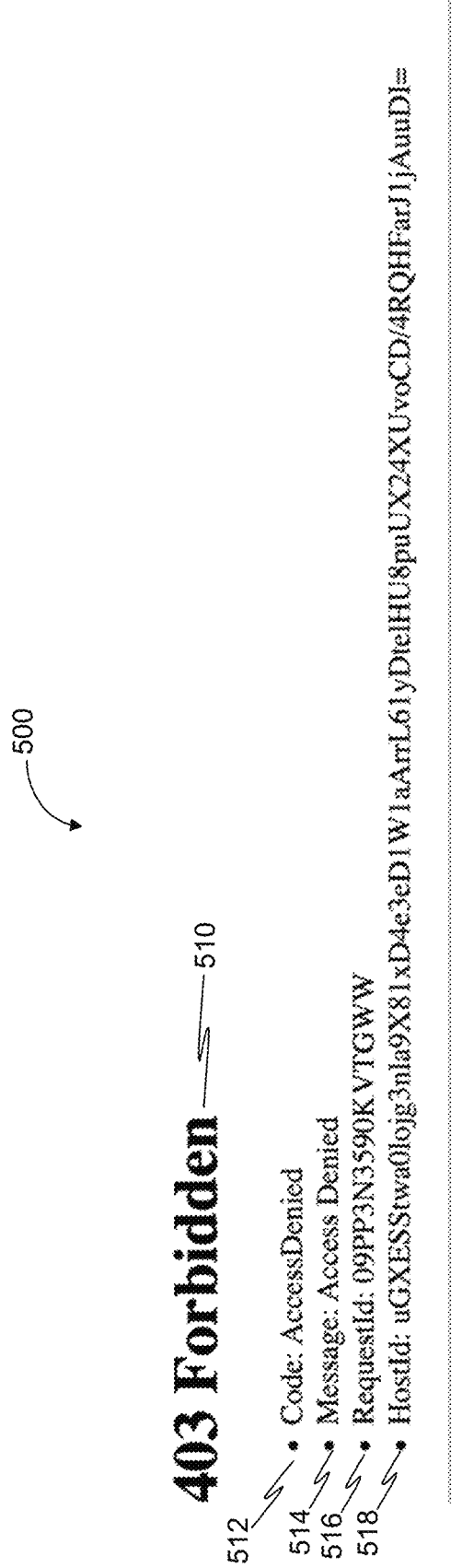
FIG. 5 is a screenshot generated by an active inspector, implemented in accordance with an embodiment.

In certain embodiments the active inspector may generate a screenshot of a user interface used to access the resource through the network path. FIG. 5 below is one such example of a screenshot of a user interface, implemented in accordance with an embodiment.

Furthermore, utilizing the active inspector to validate network paths and updating the security graph with the results allows to detect workloads which both contain a vulnerability, and have a validated network path. This allows generating an alert to a user of the cloud environment in order to address such problems by accurately characterizing cybersecurity threats. This in turn allows to utilize resources more efficiently, since the most vulnerable gaps in the cloud environment will be addressed first.

Figure 4A:
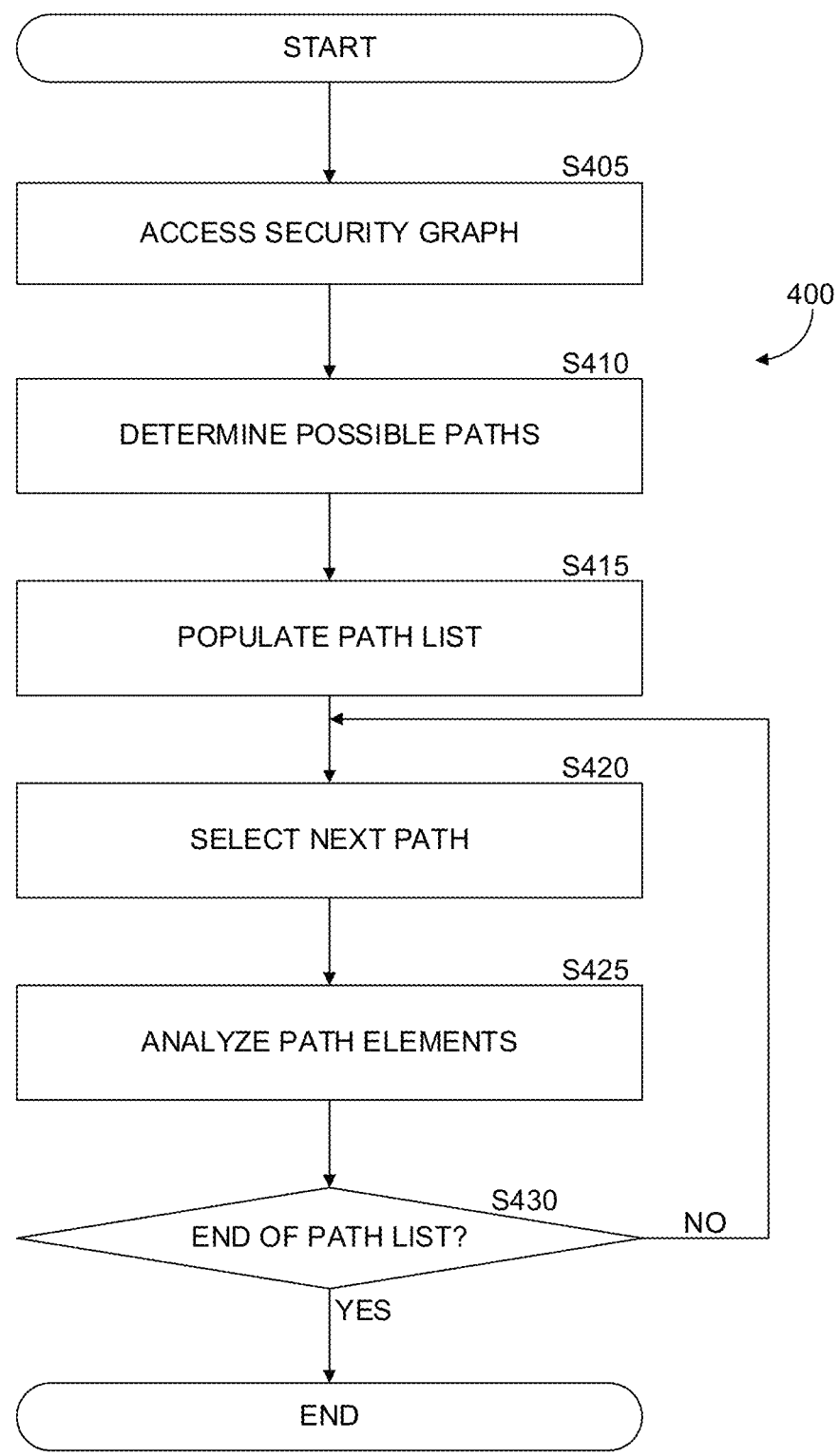
FIG. 4A is a flowchart depicting a method for determining reachable properties of security objects, according to an embodiment.

FIG. 4A is an example flowchart 400 depicting a method for determining reachable properties of security objects, according to an embodiment. A reachable property defines if and how an object on the generated security graph can be reached from an external or internal network, and/or an external or internal object. External means outside of the cloud environment of an organization. An object may be any computing or network object designated in a security graph generated as discussed above.

At S405, a security graph is accessed or otherwise obtained from the graph database. Within a security graph, various objects or entities, as may be included in a network or cloud environment of an organization, may be represented as "nodes" or "vertices," and such "nodes" or "vertices" may be interconnected by one or more "links" or "edges," the "links" or "edges" representing the relationships between the various objects included in a network or environment. Each object in the graph may be associated with known properties of the object. Examples for such properties may include an object's name, its IP address, various predefined security rules or access rules, and the like.

At S410, possible network paths within the obtained security graph are identified. A network path is a connection of two or more security objects accessible from an external or internal network, and/or an external or internal object. That is, a network path may include sequential representations of possible data/control flows between two or more objects in a graph. In an embodiment, where two objects in a graph are represented as vertices, and where the vertices are joined by an edge, a path may be constructed between the two vertices. A path may be a vertex-only path, describing a sequence of vertex-to-vertex "hops," an edge-only path, describing only the edges included in the sequence without description of the associated vertices, or a combined edge-vertex path, describing both edges and vertexes included in the sequence.

According to disclosed embodiments, a path shows a connection between security objects and/or computing objects that communicate over a network. An object may be a virtual, physical, or logical entity.

In an embodiment, paths can be identified by traversing the security graph. The traversal can start or end at objects that are connected to an external network (the internet). The traversal of the security graph can be performed using solutions disclosed in the related art, e.g., a breadth-first search (BFS), a tree traversal, and the like, as well as any combination thereof.

In another embodiment, paths can be identified by querying the graph database storing the security graph. Examples of applicable queries include, without limitation, queries configured to identify all paths between a first graph object (node) and a second graph object, queries configured to identify all paths between all graph vertices of a first object type and all graph vertices of a second object type, other, like, queries, and any combination thereof.

Following as performed at S410 through S430, the list of paths are iteratively identified to determine the reachability properties of the path. Specifically, at S415, a path list is populated to include all identified paths. A path list may be a table, list, or other type of data structure. A path list may be unordered or ordered, including ordering according to one or more path properties.

At S420, a path from the path list is selected. At a first run of the method a first path in the list is selected.

At S425, path elements are analyzed to determine reachable properties. Path element analysis, as at S425, is an iterative analysis of each element included in the path selected at S420. The operation of S425 is discussed in detail with reference to FIG. 4B.

At S430, it is determined whether the last path of the path list has been analyzed, and if so, execution terminates; otherwise, execution returns to S420.

Figure 4B:
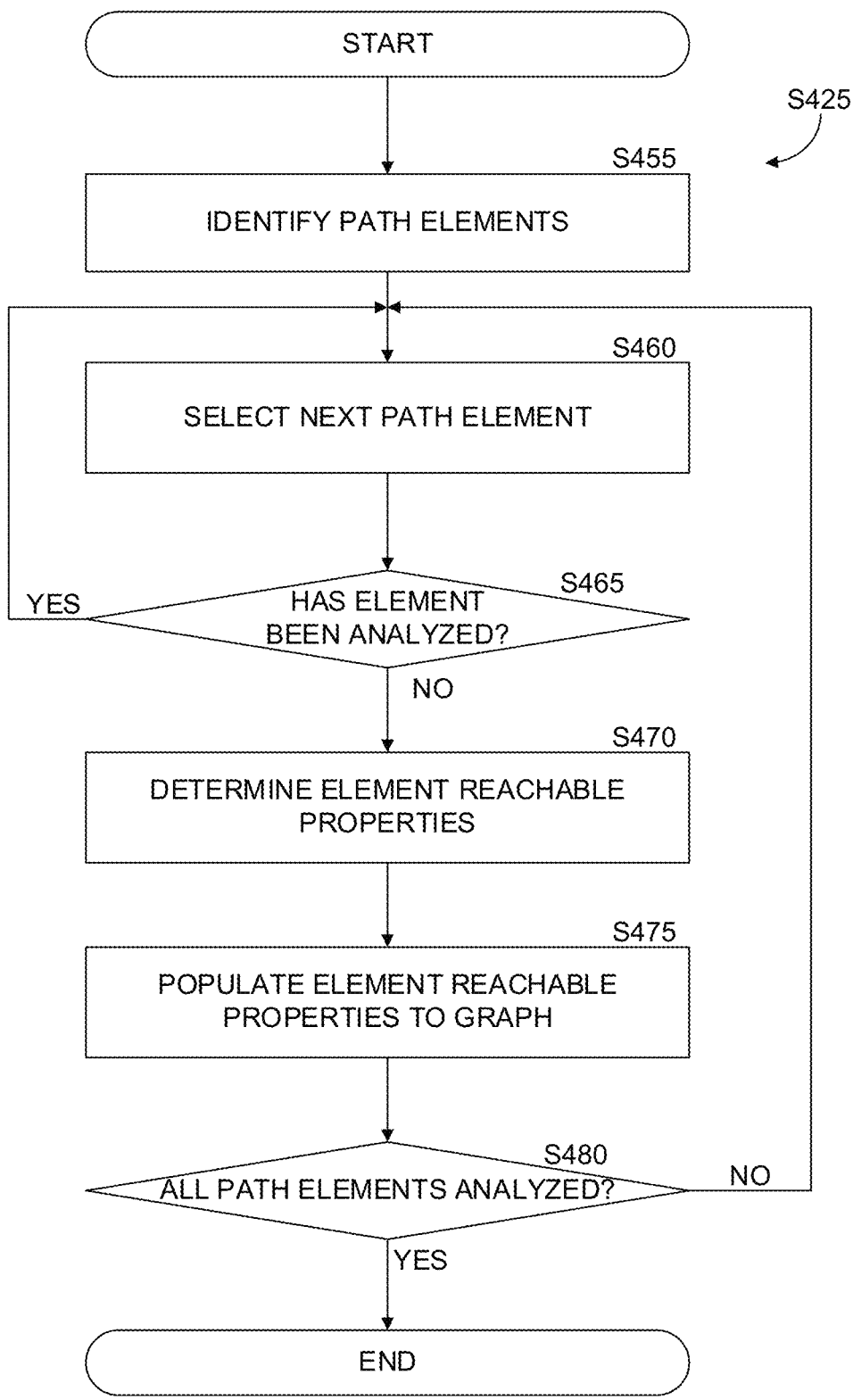
FIG. 4B is a flowchart depicting the analysis of a network path to determine reachable properties of objects included in the path, according to an embodiment.

FIG. 4B is an example flowchart S425 depicting the analysis of a network path to determine reachable properties of objects included in the path, according to an embodiment.

At S455, elements within a selected network path are identified. Elements are network and/or computing objects and relationships (or connections) between such objects. Identification of elements within the selected path may include, without limitation, identification based on properties, and other, like, data, included in the elements, identification of elements based on element identifications provided during the execution of S410 of FIG. 4A, above, and the like, as well as any combination thereof. Further, identification of in-path elements may include identification of element properties or attributes including, without limitation, names, network addresses, rulesets, port configurations, and the like, as well as any combination thereof.

Then, at S460 through S480, the list of paths are iteratively processed in order to determine reachable properties of the elements. Specifically, at S460, the next element is selected. The next element is a subsequent element of the set of elements, within the selected path, identified at S455. Where execution of S460 follows the execution of S480, the next element may be an element which, in the selected network path, immediately follows the element relevant to the preceding execution of S470 and S475. Where execution of the method described with respect to FIG. 4B includes a first execution of S460, the first execution of S460 may include the selection of a first element of the selected path.

For exemplary purposes, a network path may be a path from a virtual machine (VM), connected to a NIC, connected to a load balancer, connected to a firewall. According to a first example, where S460 is executed for the first time, the first execution of S460 may include the selection of the VM as the selected element. Further, according to a second example, where execution of S460 follows execution of S480, selection of a next element at S460 may include selection of, following the VM, selection of the NIC, or, following the NIC, selection of the load balancer, or, following the load balancer, selection of the firewall.

At S465, it is determined whether the selected element has been analyzed. Determination of whether the selected element may include the determination of whether one or more reachable properties are included in the relevant graph element. As execution of S475 provides for the population of reachable properties into the security graph, an element which does not include such reachable properties in the graph may be assumed to have not been analyzed.

Where, at S465, it is determined that the selected element has been analyzed, execution continues with S460. Where, at S465, it is determined that the selected element has not been analyzed, execution continues with S470.

At S470, reachable properties are determined. Reachable properties are object properties describing if, and how, a given path element is reachable through the selected path, and, specifically, from an external network, an internal network, both, and a combination thereof. Examples of reachable properties include, without limitation, binary properties describing whether an element is reachable, protocols by which the element is reachable, network addresses at which an element is reachable, ports by which an element is reachable, access rules, and the like, as well as any combination thereof.

In an embodiment, a reachable property is determined as a minimal set of reachable properties of all other objects in the path. As a simple example, if a path includes two objects, where one object can receive traffic from any source IP address through port 1515, and the other object can receive traffic only from a source IP address of 173.54.189.188, the reachable property of the second object may be that the second object is reachable through "source IP address 173.54.189.188 and port 1515."

At S475, reachable properties are populated into the security graph. Reachable properties, as may be determined at S470, may be populated into the graph by processes including, without limitation, labeling or tagging graph vertices (or "nodes"), updating network or graph object properties, generating one or more graph overviews, layers, or graph-adjacent data features, and the like, as well as any combination thereof.

In an embodiment, population of reachable properties into the security graph may include, for each object, population of object network access control lists (NACLs) as described hereinbelow, into the security graph elements corresponding with the various path elements, as well as the population of scope specific NACLs, and other, like, properties into the graph. Scope-specific NACLs are NACLs describing object, path, or network accessibility properties specific to a given scope, where a given scope may be the internet, various given accounts, various given environments, and the like. Scope-specific NACLs may, for example, describe the properties of an object with respect to the object's internet accessibility, where the object may be configured to include different access control properties for internet access and local intranet access.

Further, population of reachable properties into the graph may include population of one or more paths into the graph, including by population processes similar or identical to those described with respect to population of individual objects. Population of paths into the graph may include, without limitation, population of one or more paths into the graph, including a presently-analyzed path, population of one or more path properties, and the like, as well as any combination thereof. Path properties, as may be populated to a graph, are properties describing various attributes of a path, including, without limitation, NACLs applicable to path elements, path segments, or full paths, including full-path aggregate NACLs, and the like, as well as any combination thereof. Further, population of path properties into the graph may include the population of one or more scope-specific path properties, where such scope-specific path properties may be properties relevant to specific scopes, such as those described herein.

Where population of reachable properties includes labeling or tagging a graph, or elements thereof, one or more graph vertices or edges, the corresponding objects or relationships, or both, may be labeled, tagged, or otherwise associated with one or more data features describing relevant reachable properties. In addition, where population of reachable properties to the graph includes updating graph objects, graph vertices and edges, the corresponding objects and relationships, or both, may be directly updated to explicitly include the calculated properties.

Further, where population of reachable properties includes the generation of one or more graph layers or overlays, the generated graph layers or overlays may be data features independent of, but corresponding to, the relevant graphs, where the generated overlays or layers may include one or more data features describing the reachable properties of the various graph elements.

At S480, it is determined whether all elements in the selected path have been analyzed. Determination of whether all elements in the selected path have been analyzed may include, without limitation, determination of whether the immediately preceding execution of S475 relates to the last element in the selected path, determination of whether additional elements remain in the path, determination of whether any additional in-path elements have been analyzed, and the like, as well as any combination thereof.

Where, at S480, it is determined that all elements in the selected path have not been analyzed, execution continues with S460. Where, at S480, it is determined that all elements in the selected path have been analyzed, execution terminates.

FIG. 5 is an example of a screenshot 500 generated by an active inspector, implemented in accordance with an embodiment. A screenshot is an image which shows the contents of a computer display. In an embodiment, an active inspector, such as the active inspector 125 of FIG. 1, may include a web browser application for executing access instructions. The web browser application may generate a user interface intended for a display. The screenshot 500 includes a portion of such a user interface, which includes a response header 510 received based on a request to access a resource. In this case the response header 510 includes an HTTP code 403 (i.e., forbidden), meaning that the request to access the resource was denied. A detailed code 512 includes a message which is associated with the 403 code (i.e., "access denied"), a message 514, a request identifier 516, and a host identifier 518.

Figure 6:
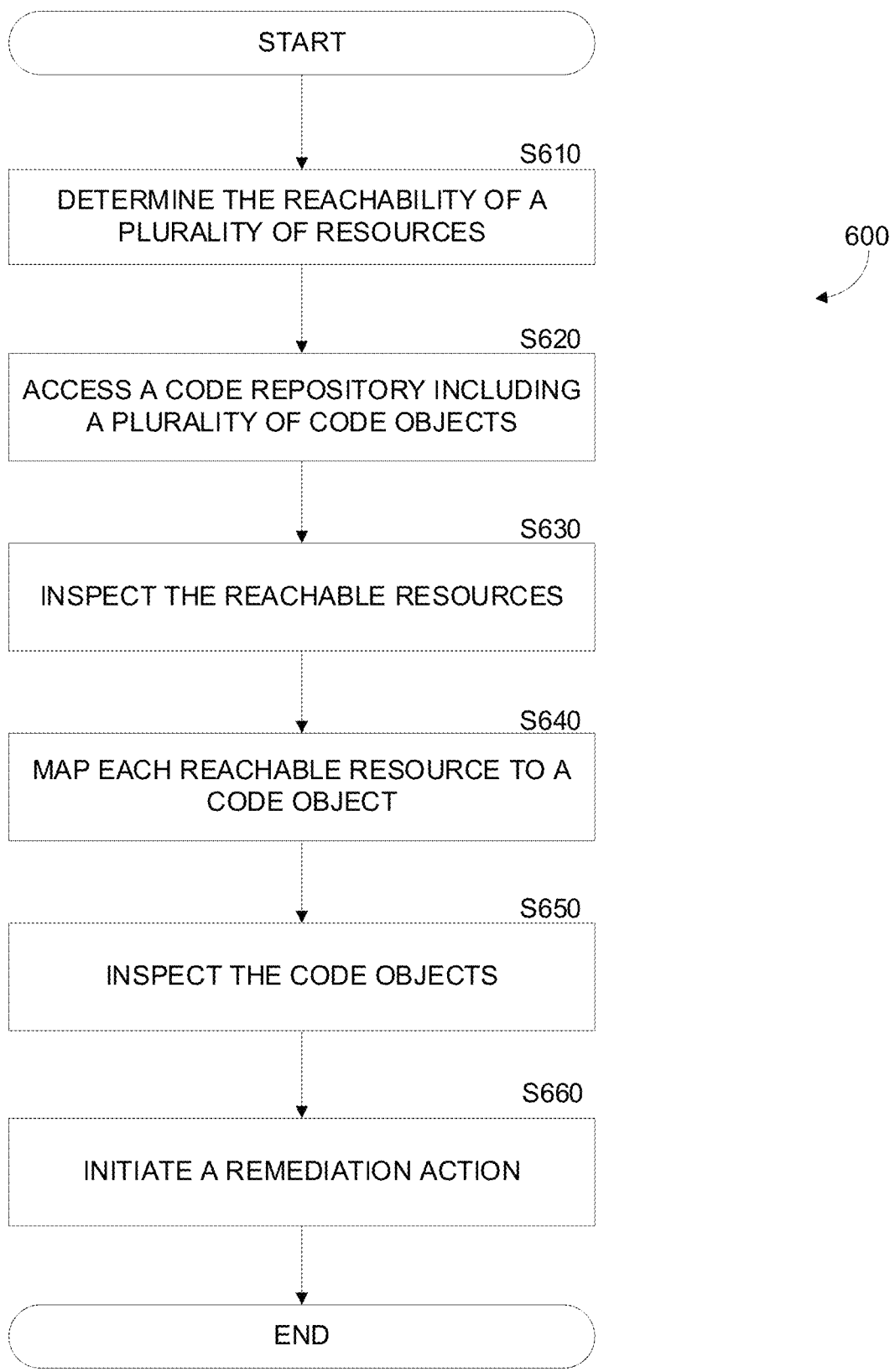
FIG. 6 is a flowchart of a method for performing inspection of a reachable code object, according to an embodiment.

FIG. 6 is a flowchart 600 of a method for performing inspection of a reachable code object, according to an embodiment.

At S610, the reachability of a resource is determined. In some embodiments, reachability is determined for a plurality of resources. In an embodiment, a resource is an entity deployed in the cloud computing environment which supplies functionality such as processing power, memory, storage, communication, a combination thereof and the like. In some embodiments, resources include virtual machines 113, container engines 115, serverless function 117, a combination thereof, and the like.

In some embodiments, various techniques of static analysis are used to determine the reachability parameters of resources deployed in the cloud computing environment. In certain embodiments, such reachability parameters are utilized to generate a network path to the resource from an external network through the cloud computing environment. In an embodiment, a resource is determined to be a reachable if there is an available network path available to access the resource (i.e., a viable path). In certain embodiments, at least a portion of the network path is external to the cloud computing environment.

At S620, a code repository is accessed. In some embodiments, the code repository includes a plurality of code objects. In an embodiment, the code repository includes a version control system (VCS) that is configured to store metadata for a file, a set of files, etc., and is further configured to store a history of changes made to those files.

For example, in an embodiment, the VCS is deployed utilizing Github®. In some embodiments, the code repository 123 is configured to store code objects, declaration code, configuration files, software images, a combination thereof, and the like. In some embodiments, the code repository is a cloud database which is configured to run in a public computing environment, a hybrid cloud environment, etc., and is managed by a database-as-a-service (DBaaS) in a cloud-based virtual machine (VM).

At S630, active inspection is initiated on a reachable resource. In an embodiment, an inspector is configured to trigger an active inspector to inspect the reachable resources to determine if their associated network paths are viable. In certain embodiments, the active inspector is configured to generate an access network instruction based on the network path.

In some embodiments, the active inspector is configured to execute a network access instruction over the network path to determine whether the network path is in fact, a viable path to reach the resource. Once the active inspector determines that the network path is viable, the active inspector is configured to send network data to the inspector, according to an embodiment. In certain embodiments, a representation of a viable network path is stored in a security database.

At S640, each reachable resource is mapped to a code object. In an embodiment, the inspector is configured to receive network data regarding network path viability from the active inspector. In some embodiments, where the network path of a resource is determined to be viable, the inspector is configured to map the reachable resource with a code object.

In an embodiment, the inspector is configured to detect an identifier of the reachable resource (e.g., resource name) and detect an identifier of a code object (e.g., code object name), and store such identifiers in a security database. In various embodiments, the inspector is configured to map the reachable resource with a code object based on their identifiers. For example, in an embodiment, a resource includes a string, alphanumeric identifier, etc., which indicates which code object, software image, etc., is utilized in deploying the resource.

In some embodiments, the inspector is configured to access a state file, for example of an IaC platform, and is further configured to detect a link in the state file between an identifier of a deployed resource, and an identifier of a code object utilized to deploy the resource.

In various embodiments, a code object is a chunk of executable code that is not bound by a function. According to some embodiments, the VCS includes code objects of an IaC platform. In an embodiment, a code object is, for example, a Terraform® code object.

At S650, mapped code objects are inspected. In some embodiments, the active inspector is configured to inspect the code objects to determine if there is a cybersecurity risk. In an embodiment, the inspector is configured to inspect the code objects to detect cybersecurity objects located within the code object.

In various embodiments, the detection of a cybersecurity object in a code object indicates a cybersecurity risk. In an embodiment, a cybersecurity risk includes any one of: a misconfiguration, a vulnerability, an exposure, a malware, a data breach, out of date software, a weak password, a required software update, a combination thereof, and the like.

In some embodiments, a plurality of cybersecurity objects indicate together a cybersecurity issue. For example, in an embodiment, detecting a first cybersecurity object and a second cybersecurity object in a single code object indicate together the presence of a cybersecurity issue, cybersecurity risk, and the like. In certain embodiments, this is also referred to as a toxic combination.

At S660, a remediation action is initiated. In an embodiment, the inspector is configured to initiate a remediation action in response to detecting a cybersecurity risk in the code object. In various embodiments, a remediation action includes any one of: revoking access to a resource, generating new lines of code, generating a new code object, revoking access from a resource, etc., a combination thereof, and the like.

For example, in an embodiment, a new code object is generated by removing the cybersecurity object from the inspected code object, and replacing the inspected code object with the new code object. In some embodiments, remediation further includes detecting resources which are deployed based on the inspected code objects, and replacing the detected resources with new resources.

In certain embodiments, replacing a detected resource includes deprovisioning the detected resource, spinning down the detected resource, etc., and provision a new resource based on the new code object.

Figure 7:
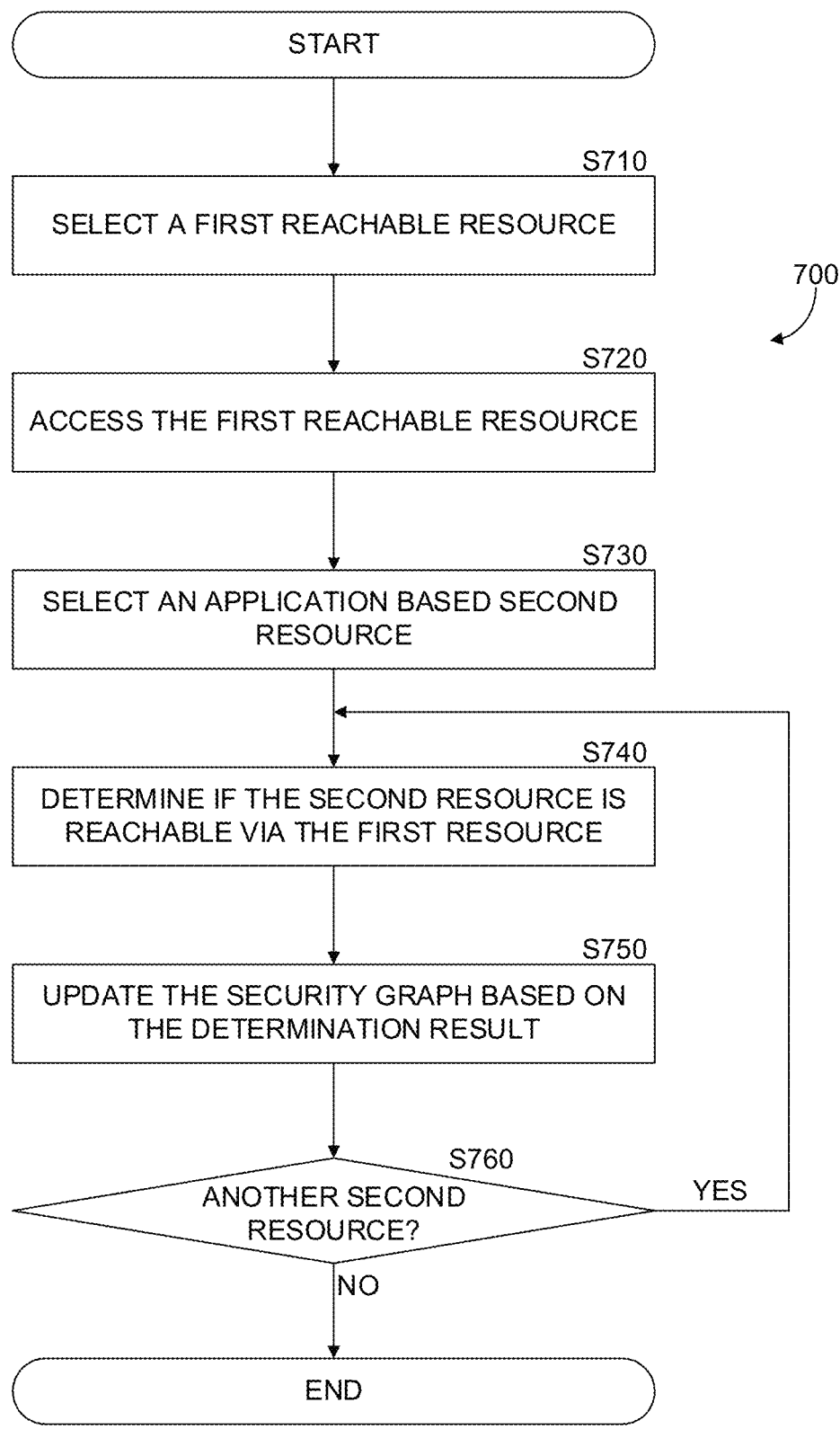
FIG. 7 is a flowchart of a method for detecting application paths, according to an embodiment.

FIG. 7 is an example flowchart 700 of a method for detecting application paths, according to an embodiment. An application path is a path an attacker may use when gaining access to a cloud computing environment, which includes a first resource through which the attacker gains access to the cloud computing environments, and subsequent second resources which the attacker is able to access in the cloud computing environment, after gaining access to the first resource, wherein the first resource corresponds to a virtual machine, container, and the like, and the second resource corresponds to an application executed (or deployed) on the first resource. In an embodiment, detecting an application path includes detecting a vulnerability which allows to reach a first resource, gain access to it, and through the first resource gain access to a second resource which is accessible to the first resource, but should not be accessible, for example, to the user account or service account accessing the first resource.

At S710, a reachable first resource is selected. In an embodiment, a reachable first resource may be selected from a list of reachable resources. The list may be stored, for example, as a table in a database. The list may include an identifier of each reachable resource, and at least one viable network path. A reachable resource is a resource which is reachable from an external network, in that the external network is external to a cloud computing environment in which the resource is deployed. In an embodiment, a reachable resource includes a network path, reachability parameters, and the like, for example as discussed in more detail above. A reachable resource is a resource which includes at least a viable network path, having reachability parameters which allow access from an external network to the resource, the resource deployed in a cloud computing environment. In an embodiment, a security graph may be queried to generate a result which includes at least a reachable resource. In certain embodiments, the generated result includes a plurality of reachable resources, each having its own at least a viable network path. In other embodiments, the result includes a plurality of network paths for a reachable resource (i.e., the resource is reachable from a plurality of network paths).

At S720, the first resource is accessed. In an embodiment, accessing the first resource includes providing the first resource with credentials which allow access to the first resource. For example, a private key may allow accessing an SSH server. As another example, an API gateway, such as the API gateway 230 of FIG. 2 may be accessed by providing credentials. As yet another example, a load balancer (first resource) may provide access to a server (second resource), which listens on an application address. For example, an SSH server may be exposed behind a load balancer, listening on a local application address (e.g., 10.0.0.115). By accessing the load balancer, which includes an external network path, and from there accessing the application address, an attacker may gain access to the SSH server.

At S730, a second resource is selected. In an embodiment, the second resource is an application exposed through the first resource. In an embodiment a security graph is queried to determine the second resource. In some embodiments, the cloud computing environment in which the first resource is deployed is represented in the security graph, for example as detailed in FIG. 2 above. In some embodiments, querying the security graph includes causing a query to be executed on a database hosting the security graph, and receiving as a result an identifier of a node which represents a second resource which is connected to the node representing the first resource.

For example, a security graph may be traversed to detect a node representing an application (application node) which is connected to the node representing the first resource. A second network path may be determined, to the application node from the first resource node. For example, the first resource may be accessed by accessing "example.com:80", while the second resource (i.e., application node) is accessed by using an application address, or other listening address. In an embodiment, an application may be predetermined to be listening on an address, port, and the like. The second network path may be generated based on the predetermined listening.

As another example, the application node may indicate that a web server application (second resource) is deployed on a virtual machine (first resource). An access attempt may include generating an access instruction on the first resource (first network path) using port 80 (second network path), which is a predetermined port used for Internet web traffic.

At S740, the second resource is actively determined to be reachable via the first resource. In an embodiment, a second resource is reachable from the first resource, if the first resource can be used to access the second resource. In the example above, if the web server is reachable through the virtual machine, then the web server is reachable. Thus, if the first resource is a reachable resource, meaning that a network path is found which is viable, and the second resource is accessible from the first resource, then an attacker which gains access to the first resource may also gain access to the second resource. Thus, while the second resource may not have a direct viable network path, it can still become reachable by accessing the first resource, meaning that there is a second network path, which is the network path between the first resource and the second resource. In an embodiment, a resource is accessible if, for example, it can be sent instructions which are then executed by the resource. For example, a SQL database may be determined to be reachable if a network path is determined to a virtual machine hosting the SQL database application, and a second network path allows access to the SQL database (i.e., application path), and further an instruction for performing an SQL injection is generated for execution by the SQL database application.

At optional S750, a security graph is updated based on the determination. In some embodiments, a node may include an indicator to indicate if a resource is reachable. In other embodiments, an edge may be added between a node representing the first resource and a node representing the second resource, to indicate that the second resource is reachable from the first resource. Actively inspecting second resources in this manner allows to detect certain vulnerabilities in a cloud computing environment, which is of course desirable.

At S760, a check is performed to determine if another second resource should be checked for reachability from the first resource. In an embodiment execution continues at S740 if another resource should be checked to determine reachability, otherwise execution terminates. For example, if another application is determined to be deployed on the first resource, e.g., by traversing a security graph and detecting another application node connected to the first resource node, a second application path may be determined and reachability thereto may be determined by performing the method detailed herein.

Figure 8:
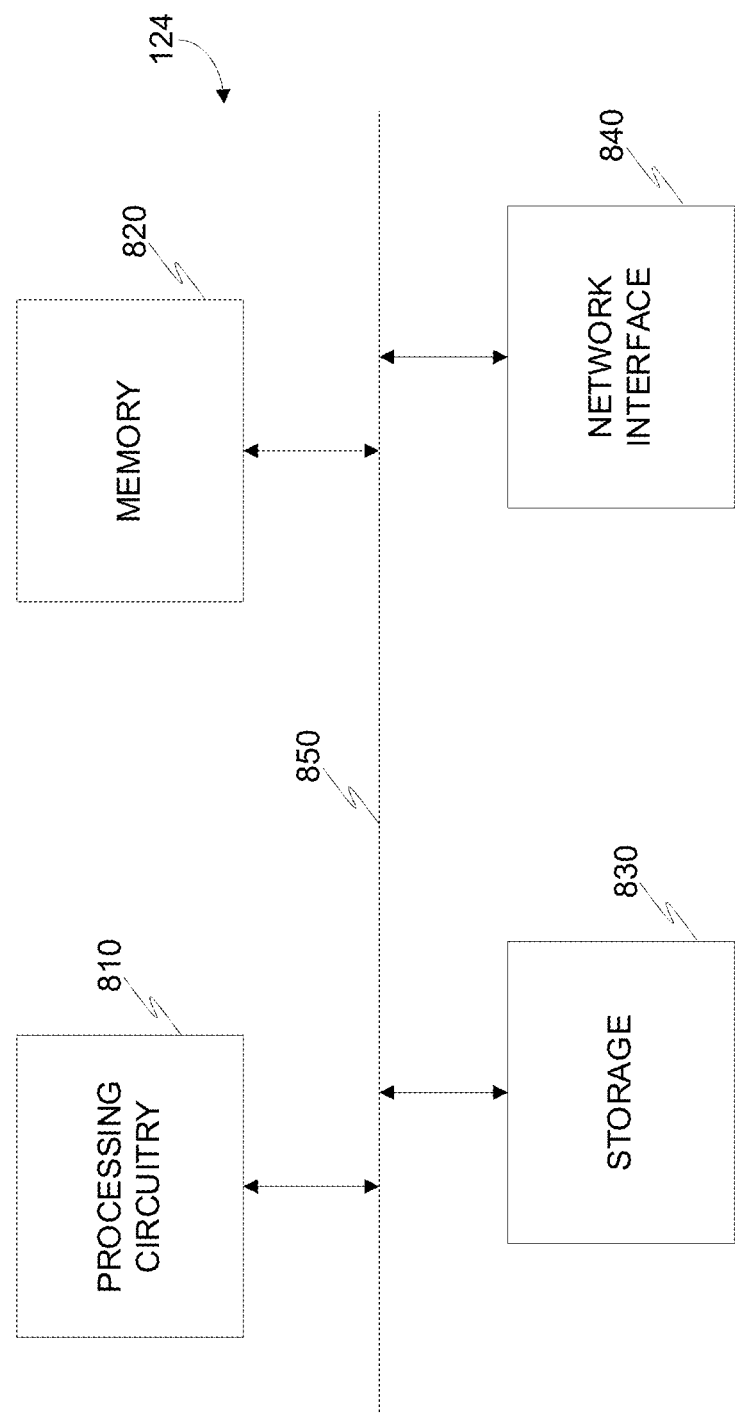
FIG. 8 is a schematic diagram of an active inspector according to an embodiment.

FIG. 8 is an example schematic diagram of an inspector 124 according to an embodiment. The inspector 124 includes a processing circuitry 810 coupled to a memory 820, a storage 830, and a network interface 840. In an embodiment, the components of the inspector 124 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the inspector 124 to communicate with, for example, a cloud environment, a security graph database, resources from the cloud environment, and the like.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for performing inspection of a reachable code object of a cloud computing environment, comprising:
    detecting a network path for each resource of a plurality of resources deployed in a cloud computing environment, wherein the network path includes at least a portion between an external network and the cloud computing environment;
    determining reachability parameters of each resource of the plurality of resources for which a network path is detected;
    accessing a code repository including a plurality of code objects;
    actively inspecting the network path of a resource to determine if the network path is a viable network path;
    mapping each resource having a viable network path to a code object of the plurality of code objects;
    inspecting a mapped code object for a cybersecurity object; and
    initiating a remediation action based on the cybersecurity object.

2. The method of claim 1, further comprising:
    generating the reachability parameters utilizing static analysis.

3. The method of claim 2, further comprising:
    generating the network path for a resource based on the reachability parameters.

4. The method of claim 1, further comprising:
    determining whether the network path is viable by executing an access instruction over the network path.

5. The method of claim 1, further comprising:
    detecting an identifier of a resource;
    detecting an identifier of a code object, wherein the identifier of the resource indicates the identifier of the resource.

6. The method of claim 5, further comprising:
    mapping the resource to the code object based on the detected identifiers.

7. The method of claim 6, further comprising:
inspecting only a mapped code object for a cybersecurity object.

8. The method of claim 1, further comprising:
detecting a second cybersecurity object in the mapped code object; and
detecting a cybersecurity risk based on the detected cybersecurity object and the detected second cybersecurity object.

9. The method of claim 1, wherein the remediation action includes any one of: revoking access to a resource, generating a new code object, revoking access from a resource, and any combination thereof.

10. The method of claim 1, further comprising:
initiating the remediation action to generate a new code object, the new code object based on the mapped code object.

11. The method of claim 10, further comprising:
generating the new code object by removing the cybersecurity object from the mapped code object.

12. A device for performing inspection of a reachable code object of a cloud computing environment comprising:
one or more processing circuitries configured to:
detect a network path for each resource of a plurality of resources deployed in a cloud computing environment, wherein the network path includes at least a portion between an external network and the cloud computing environment;
determine reachability parameters of each resource of the plurality of resources for which a network path is detected;
access a code repository including a plurality of code objects;
actively inspect the network path of a resource to determine if the network path is a viable network path;
map each resource having a viable network path to a code object of the plurality of code objects;
inspect a mapped code object for a cybersecurity object; and
initiate a remediation action based on the cybersecurity object.

13. A system for performing inspection of a reachable code object of a cloud computing environment comprising:
a processing circuitry;
a memory, the memory containing instructions that, when executed by the processing circuitry, configure the system to:
detect a network path for each resource of a plurality of resources deployed in a cloud computing environment, wherein the network path includes at least a portion between an external network and the cloud computing environment;
determine reachability parameters of each resource of the plurality of resources for which a network path is detected;
access a code repository including a plurality of code objects;
actively inspect the network path of a resource to determine if the network path is a viable network path;
map each resource having a viable network path to a code object of the plurality of code objects;
inspect a mapped code object for a cybersecurity object; and
initiate a remediation action based on the cybersecurity object.

14. The system of claim 13, wherein the memory contains further instructions which when executed by the processing circuitry further configure the system to:
generate the reachability parameters utilizing static analysis.

15. The system of claim 14, wherein the memory contains further instructions which when executed by the processing circuitry further configure the system to:
generate the network path for a resource based on the reachability parameters.

16. The system of claim 13, wherein the memory contains further instructions which when executed by the processing circuitry further configure the system to:
determine whether the network path is viable by executing an access instruction over the network path.

17. The system of claim 13, wherein the memory contains further instructions which when executed by the processing circuitry further configure the system to:
detect an identifier of a resource; and
detect an identifier of a code object, wherein the identifier of the resource indicates the identifier of the resource.

18. The system of claim 17, wherein the memory contains further instructions which when executed by the processing circuitry further configure the system to:
map the resource to the code object based on the detected identifiers.

19. The system of claim 18, wherein the memory contains further instructions which when executed by the processing circuitry further configure the system to:
inspect only a mapped code object for a cybersecurity object.

20. The system of claim 13, wherein the memory contains further instructions which when executed by the processing circuitry further configure the system to:
detect a second cybersecurity object in the mapped code object; and
detect a cybersecurity risk based on the detected cybersecurity object and the detected second cybersecurity object.

21. The system of claim 13, wherein the remediation action includes any one of:
revoking access to a resource, generating a new code object, revoking access from a resource, and any combination thereof.

22. The system of claim 13, wherein the memory contains further instructions which when executed by the processing circuitry further configure the system to:
initiate the remediation action to generate a new code object, the new code object based on the mapped code object.

23. The system of claim 22, wherein the memory contains further instructions which when executed by the processing circuitry further configure the system to:
generate the new code object by removing the cybersecurity object from the mapped code object.

* * * * *